(12) United States Patent
Roberts et al.

(10) Patent No.: US 6,269,655 B1
(45) Date of Patent: Aug. 7, 2001

(54) DUAL MIXED REFRIGERANT CYCLE FOR GAS LIQUEFACTION

(76) Inventors: Mark Julian Roberts, P.O. Box 486, New Tripoli, PA (US) 18066; Rakesh Agrawal, 4312 Commonwealth Dr., Emmaus, PA (US) 18049

( * ) Notice: Subject to any disclaimer, the term of this patent is extended or adjusted under 35 U.S.C. 154(b) by 0 days.

(21) Appl. No.: 09/633,794

(22) Filed: Aug. 7, 2000

Related U.S. Application Data

(63) Continuation of application No. 09/208,562, filed on Dec. 9, 1998, now Pat. No. 6,119,479.

(51) Int. Cl.[7] .................................................. G25J 1/00
(52) U.S. Cl. ................................................. 62/612; 62/335
(58) Field of Search ............................. 62/612, 335, 606

(56) References Cited

U.S. PATENT DOCUMENTS

| | | | |
|---|---|---|---|
| 4,094,655 | 6/1978 | Krieger | 62/40 |
| 4,112,700 | 9/1978 | Forg | 62/28 |
| 4,274,849 * | 6/1981 | Garier et al. | 62/612 |
| 4,339,253 | 7/1982 | Caetani et al. | 62/40 |
| 4,504,296 | 3/1985 | Newton | 62/31 |
| 4,525,185 | 6/1985 | Newton | 62/11 |
| 4,539,028 | 9/1985 | Paradowski et al. | 62/9 |
| 4,545,795 | 10/1985 | Liu et al. | 62/11 |
| 4,755,200 | 7/1988 | Liu et al. | 62/11 |
| 4,809,154 | 2/1989 | Newton | 364/148 |
| 4,911,741 * | 3/1990 | Davis et al. | 62/612 |
| 5,943,881 * | 8/1999 | Grenier | 62/612 |
| 6,119,479 * | 9/2000 | Roberts et al. | 62/612 |

OTHER PUBLICATIONS

Paradowski, H., et al., "La Liquefaction des Gas Associes", 7th Internationall Conference on Lng, May 15–19, 1983.

Bronfenbrenner, J., et al., "APCI Gas Liquefaction Process Offshore", Conference on Monetizing Stranded Gas Reserves, Dec. 11–12, 1997.

* cited by examiner

Primary Examiner—William Doerrler
(74) Attorney, Agent, or Firm—John M. Fernbacher

(57) ABSTRACT

Process and system for liquefying a pressurized gas, especially natural gas. The process is carried out in two heat exchangers, and cooling for each heat exchanger is provided by a mixed refrigerant which is vaporized at a single essentially constant pressure. Feed precooling, low level refrigerant precooling, and high level liquid refrigerant subcooling are effected in one of the heat exchanger against low level refrigerant vaporizing at a single essentially constant pressure. The process and system of the invention are especially well-suited for installation on ships, barges, and offshore platforms.

2 Claims, 5 Drawing Sheets

DUAL MIXED REFRIGERANT CYCLE FOR GAS LIQUEFACTION

CROSS-REFERENCE TO RELATED APPLICATIONS

This application is a continuation of copending application(s) application Ser. No. 09/208,562 filed on Dec. 9, 1998, now U.S. Pat. No. 6,119,479.

BACKGROUND OF THE INVENTION

The liquefaction of natural gas at remote sites, transportation of the liquefied natural gas (LNG) to population centers, and storage and vaporization of LNG for local consumption have been successfully practiced for many years around the world. LNG production sites are usually located on land at remote sites having docking facilities for large LNG tankers which transport the LNG to end users.

Numerous process cycles have been developed for LNG production to provide the large refrigeration requirements for liquefaction. Such cycles typically utilize combinations of single-component refrigeration systems using propane or single chlorofluorocarbon refrigerants operated in combination with one or more mixed refrigerant (MR) systems. Well-known mixed refrigerants typically comprise light hydrocarbons and optionally nitrogen and utilize compositions tailored to the temperature and pressure levels of specific process steps.

The objectives in the design and operation of current LNG process cycles and equipment have been to minimize energy consumption and maximize LNG production while operating at changing product demand rates and varying ambient temperature conditions. Since LNG production facilities are typically land-based in remote locations, the land area required for plant battery limits has not been a critical factor in plant design and layout.

Numerous mixed refrigerant (MR) LNG cycles have been disclosed in the art. These cycles generally use a first refrigerant which vaporizes at a higher temperature (i.e., the warm or high level MR) in a first heat exchanger (i.e., the warm or high level exchanger) and a second refrigerant which vaporizes at a lower temperature (i.e., the cold or low level MR) in a second heat exchanger (i.e., the cold or low level exchanger). U.S. Pat. No. 4,274,849 describes a dual mixed refrigerant process in which feed gas is first cooled in a separate exchanger using the refrigerant fluid exiting the cold or low level MR heat exchanger. The precooled feed is then further cooled and liquefied in the cold MR exchanger. The vaporized low level refrigerant after compression is cooled against the warm or high level refrigerant in the warm or high level MR exchanger. A disadvantage of this process is that an extra heat exchanger is required for feed precooling.

U.S. Pat. No. 4,112,700 discloses a dual MR process in which the high level MR is boiled at three different pressure levels with interstage compression. This requires the use of multiple heat exchangers or multiple heat exchange zones, which requires multiple return streams to the compressor. Such multiple heat exchange/compression stages have a disadvantage from a thermodynamic perspective, since non-equilibrium streams of differing compositions are mixed interstage in the warm mixed refrigerant compression train. The mixing of streams causes a thermodynamic irreversibility which will result in reduced cycle efficiency.

A dual mixed refrigerant process is described in U.S. Pat. No. 4,525,185 wherein the high level MR is boiled at three different pressure levels. This requires the use of multiple heat exchangers or heat exchange zones, and leads to multiple vessels, valves, and piping associated with the interstage feeds to the high level MR compressor, and increases the area required for the plant. In this process, the feed is first cooled using low level MR exiting the low level MR heat exchanger. The disadvantage of this approach is that an extra heat exchanger is required as in U.S. Pat. No. 4,274,849 cited above. In this process cycle, non-equilibrium streams are mixed interstage in the high level mixed refrigerant compression train, which causes thermodynamic irreversibility and reduces cycle efficiency.

U.S. Pat. No. 4,545,795 discloses a dual MR process wherein the high level MR is boiled at three different pressure levels. This requires the use of multiple heat exchangers or heat exchange zones in the high level MR heat exchanger. In this process, the feed is first cooled using the fluid exiting the low level MR exchanger, and this requires an additional heat exchanger as in U.S. Pat. No. 4,274,849 cited above. This flowsheet also has a disadvantage from a thermodynamic perspective, since non-equilibrium streams are mixed interstage in the high level MR compression train which causes thermodynamic irreversibility as earlier discussed.

A dual mixed refrigerant process is U.S. Pat. No. 4,539,028 in which the high level MR is boiled at three different pressure levels, which requires the use of multiple heat exchangers or heat exchange zones. The low level mixed MR is boiled at two different pressure levels, which also requires the use of multiple heat exchangers or heat exchange zones. In this process, the feed is first cooled using the low level MR, which requires an extra heat exchanger, a disadvantage shared by several of the processes cited above. This cycle also has a disadvantage from a thermodynamic perspective, since non-equilibrium streams are mixed interstage in the mixed refrigerant compression train. This mixing causes a thermodynamic irreversibility which will result in reduced cycle efficiency.

A paper entitled "Liquefaction of Associated Gases" by H. Paradowski et al presented at the $7^{th}$ International Conference on LNG, May 15–19, 1983 describes a dual MR process in which the high level mixed refrigerant is boiled at three different pressure levels. This requires the use of multiple heat exchangers or heat exchange zones. In addition, the feed is first cooled using the low level MR exiting the low level MR exchanger, and this requires an extra heat exchanger. This process also has a disadvantage from a thermodynamic perspective, since high level MR streams are generally not in thermal equilibrium with the interstage stream before the high level and interstage MR streams are mixed in the refrigerant compression train. This mixing of streams into the main flow of the compressor causes a thermodynamic irreversibility which will result in reduced cycle efficiency.

U.S. Pat. No. 4,911,741 discloses a dual MR process in which the high level MR is boiled at three different pressure levels. This requires the use of multiple heat exchangers or heat exchange zones and also has a disadvantage from a thermodynamic perspective as earlier discussed, since streams which are potentially at different temperatures are mixed interstage in the high level mixed refrigerant compression train. This mixing of streams causes thermodynamic irreversibility which will result in reduced cycle efficiency.

A dual MR process is described in U.S. Pat. No. 4,339.253 in which the high level MR is boiled at two different pressure levels. In addition, an interstage liquid stream from the high level MR is boiled at a third pressure. This requires the use of multiple heat exchangers or heat exchange zones. In this process, the feed is initially cooled before heavier hydrocarbon removal by heat exchange with the low level MR vapor exiting warm end of the low level MR exchanger. The disadvantage of this approach is that an extra heat exchanger is required. This heat exchange also increases the pressure drop of the low level MR stream before compression. As in several of the processes described above, this process has a thermodynamic disadvantage since non-equilibrium streams are mixed interstage in the high level MR compression train. The mixing of streams into the main flow causes thermodynamic irreversibility which will result in reduced cycle efficiency.

U.S. Pat. No. 4,094,655 describes a dual MR process where the low level MR is boiled at two different pressure levels, which requires the use of multiple heat exchangers or heat exchange zones. In this process, the high level MR is first cooled using the fluid from the low level MR exchangers, rather than being cooled by the high level mixed refrigerant loop itself. The disadvantage of this approach is that an extra heat exchanger is required. As in several of the processes described above, this process has a thermodynamic disadvantage since non-equilibrium streams are mixed interstage in the high level MR compression train. The mixing of streams into the main flow causes thermodynamic irreversibility which will result in reduced cycle efficiency.

Additional dual MR processes in which the high level MR is boiled at several different pressure levels are described in U.S. Pat. Nos. 4,504,296; 4,525,185; 4,755,200; and 4,809,154.

The LNG processes described above typically are utilized at land-based locations, and the land area required for the plant battery limits generally is not a critical factor in plant design and layout. Recently, commercial interest has been increasing in the potential recovery of gas reserves not amenable to land-based liquefaction processes as described above. Such reserves are found in offshore locations, and the recovery of these reserves has generated a growing need for gas liquefaction systems amenable to installation on ships, barges, and offshore platforms.

Most large LNG production plants employ a propane refrigerant cycle to precool the feed gas prior to further cooling and liquefaction by means of multicomponent or mixed refrigerant (MR) cycles. The propane pre-cooled cycle, while very efficient and cost effective in land-based plants, has certain disadvantages for shipboard or barge applications. The necessity of maintaining fairly large quantities of propane presents potential safety concerns, and the numerous propane evaporators consume scarce plot plan area. Several examples of dual mixed refrigerant cycles as described above reduce propane inventory in propane pre-cooling systems, but require numerous heat exchangers and vessels which increase the required plot plan area, and therefore are not suitable for offshore applications.

The present invention addresses the need for a natural gas liquefaction process having a minimum plot plan area which is suitable for offshore applications and which can operate at high efficiency without propane precooling in a cycle which is both compact and cost effective. A natural gas liquefaction process and system to meet these objectives is described below and defined in the claims which follow.

BRIEF SUMMARY OF THE INVENTION

The invention is a method for liquefying a pressurized feed gas which comprises:

(a) cooling the pressurized feed gas by indirect heat exchange in a first heat exchange zone with a first vaporizing mixed refrigerant which is vaporized at a first essentially constant pressure to yield a cooled feed gas and a first mixed refrigerant vapor;

(b) further cooling and condensing the cooled feed gas by indirect heat exchange in a second heat exchange zone with a second vaporizing mixed refrigerant which is vaporized at a second essentially constant pressure to yield a liquid product and a second mixed refrigerant vapor;

(c) compressing the first mixed refrigerant vapor; and cooling, condensing, and flashing the resulting compressed first mixed refrigerant vapor to provide the first vaporizing mixed refrigerant; and (d) compressing the second mixed refrigerant vapor; and cooling, condensing, and flashing the resulting compressed second mixed refrigerant vapor to provide the second vaporizing mixed refrigerant, wherein at least a portion of the refrigeration for the cooling and condensing of the second mixed refrigerant vapor is provided by indirect heat exchange in the first heat exchange zone with the first vaporizing liquid mixed refrigerant.

The compressing of the first mixed refrigerant vapor in (c) can be carried out as required in at least two stages of compression which generates at least one interstage two-phase refrigerant stream; the interstage two-phase refrigerant stream is separated into an interstage refrigerant vapor and an interstage refrigerant liquid; the interstage refrigerant vapor is compressed to yield a further compressed refrigerant; the interstage liquid refrigerant is pumped to yield a further pressurized liquid refrigerant; the further compressed refrigerant and the further pressurized liquid refrigerant is combined; and the resulting combined first mixed refrigerant is cooled, condensed, optionally subcooled, and flashed to provide the first vaporizing mixed refrigerant in (a).

At least a portion of the refrigeration for the cooling and condensing of the first mixed refrigerant vapor after compression can be provided by indirect heat exchange in the first heat exchange zone with the first vaporizing liquid mixed refrigerant. Typically, the first vaporizing mixed refrigerant is vaporized in a pressure range of about one to about 30 bar absolute and the second vaporizing mixed refrigerant is vaporized in a pressure range of about one to about 15 bar absolute.

The first mixed refrigerant vapor normally comprises two or more components selected from the group consisting of nitrogen, methane, ethane, ethylene, propane, propylene, i-butane, butane, i-pentane, chlorinated hydrocarbons, and fluorinated hydrocarbons. The second mixed refrigerant vapor normally comprises two or more components selected from the group consisting of nitrogen, methane, ethane, ethylene, propane, propylene, i-butane, butane, i-pentane, chlorinated hydrocarbons, and fluorinated hydrocarbons.

Preferably the pressurized feed gas is provided by treating a pressurized stream of natural gas to remove contaminants selected from the group consisting of water, carbon dioxide, sulfur-containing compounds, mercury, and mercury-containing compounds. If required, hydrocarbons heavier than methane can be removed from the pressurized feed gas by (1) introducing the cooled feed gas into a distillation column at a first location, and withdrawing therefrom a methane-rich overhead stream and a bottoms stream of components heavier than methane; and (2) separating the bottoms stream to obtain a first hydrocarbon stream comprising components with up to four carbon atoms and a second hydrocarbon stream comprising components with more than four carbon atoms.

Optionally, this method can further comprise (3) cooling at least a portion of the first hydrocarbon stream by indirect heat exchange in the first heat exchange zone; and (4) combining the resulting cooled hydrocarbon stream with the methane-rich overhead stream prior to the further cooling and condensing by indirect heat exchange in a second heat exchange zone in (b).

The liquid product of (b) can be a methane-rich liquid, and the methane-rich liquid product can be flashed and separated to yield a further enriched liquid methane product and an offgas stream comprising components lighter than methane.

A portion of the refrigeration for the cooling and condensing of the second mixed refrigerant vapor after compression can be provided at least in part by indirect heat exchange in a third heat exchange zone with the offgas stream comprising components lighter than methane. In addition, a portion of the refrigeration for the cooling and condensing of the second mixed refrigerant vapor after compression can be provided at least in part by indirect heat exchange in the second heat exchange zone with the second vaporizing mixed refrigerant.

The second mixed refrigerant vapor after compression can be cooled by indirect heat exchange in the first heat exchange zone and withdrawn therefrom at a first temperature. The resulting cooled second mixed refrigerant stream can be introduced into the second heat exchange zone and further cooled therein by indirect heat exchange. The second mixed refrigerant vapor can be withdrawn from the second heat exchange zone at a second temperature which preferably is lower than the first temperature, and the resulting further cooled second mixed refrigerant vapor preferably is compressed directly without preheating.

The process of the invention may further comprise removing hydrocarbons heavier than methane from the pressurized feed gas prior to further cooling and condensing by indirect heat exchange in a second heat exchange zone in (b) by (1) cooling the pressurized feed gas and introducing the resulting cooled feed gas into a distillation column and withdrawing therefrom a methane-rich overhead stream and a bottoms stream comprising components heavier than methane;

(2) separating the bottoms stream to obtain a first hydrocarbon stream comprising components with up to four carbon atoms and a second hydrocarbon stream comprising components with greater than four carbon atoms;

(3) cooling the first hydrocarbon stream by indirect heat exchange in the first heat exchange zone; and (4) utilizing at least a portion of the resulting cooled hydrocarbon stream of (3) as reflux for the distillation column of (1).

Optionally, a portion of the pressurized feed gas can be introduced into the distillation column at a second location which is below the first location.

Compressing of the first mixed refrigerant vapor in (c) above can be carried out if required in at least two stages of compression which generates an interstage compressed refrigerant; the interstage compressed refrigerant is cooled, partially condensed, and separated into an interstage refrigerant vapor and an interstage refrigerant liquid; the interstage refrigerant vapor is compressed to yield a further compressed refrigerant which is cooled, condensed, optionally subcooled, and flashed to provide the first vaporizing mixed refrigerant in (a) above; and the interstage liquid refrigerant is subcooled and flashed at the first essentially constant pressure to yield additional refrigeration in the first heat exchange zone.

The cooling and condensing of the second mixed refrigerant vapor following compression can be effected by indirect heat exchange in the first heat exchange zone to yield a partially condensed second mixed refrigerant stream containing intermediate second mixed refrigerant vapor and intermediate second mixed refrigerant liquid.

In a number of additional and optional steps, (1) the partially condensed second mixed refrigerant stream is separated to yield an intermediate second mixed refrigerant vapor and an intermediate second mixed refrigerant liquid;

(2) the intermediate second mixed refrigerant vapor is cooled, condensed, optionally subcooled, and flashed to provide the second vaporizing mixed refrigerant of (c); and (3) the intermediate second mixed refrigerant liquid is subcooled and flashed at the second essentially constant pressure to yield additional refrigeration in the second heat exchange zone.

The invention includes a system for liquefying a pressurized feed gas which comprises:

(a) first heat exchange means for cooling the pressurized feed gas, for cooling a compressed first mixed refrigerant, and for cooling a compressed second mixed refrigerant, wherein cooling is effected at least in part by indirect heat exchange with a first vaporizing mixed refrigerant which is vaporized at a first essentially constant pressure, wherein the cooling yields a cooled pressurized feed gas, a liquefied first mixed refrigerant, and a cooled second compressed mixed refrigerant, and wherein the first vaporizing mixed refrigerant yields a first mixed refrigerant vapor;

(b) first compression means for compressing the first mixed refrigerant vapor to provide the compressed first mixed refrigerant;

(c) pressure reduction means for flashing the liquefied first mixed refrigerant to provide the first vaporizing mixed refrigerant;

(d) second heat exchange means for further cooling and condensing the cooled feed gas and for further cooling and liquefying the cooled second compressed mixed refrigerant, wherein cooling is effected at least in part by indirect heat exchange with a second vaporizing mixed refrigerant which is vaporized at a second essentially constant pressure, wherein the cooling yields a liquid product and liquefied second mixed refrigerant, and wherein the second vaporizing mixed refrigerant yields a second mixed refrigerant vapor;

(e) second compression means for compressing the second mixed refrigerant vapor to provide the compressed second mixed refrigerant;

(f) pressure reduction means for flashing the liquefied second mixed refrigerant to provide the second vaporizing mixed refrigerant; and (g) piping means for
introducing the pressurized feed gas into the first heat exchange means,
transferring the cooled feed gas from the first heat exchange means to the second heat exchange means,
withdrawing a liquid product from the second heat exchange means, transferring the first mixed refrigerant vapor from the first heat exchange means to the first compression means and for transferring the resulting compressed first mixed refrigerant vapor from the first compression means to the first heat exchange means, transferring the cooled second compressed mixed refrigerant from the first heat exchange means to the second heat exchange means, and transferring the second mixed refrigerant vapor from the second heat exchange means to the second compression means and for transferring the resulting compressed second mixed refrigerant vapor from the second compression means to the first heat exchange means.

The first compression means can comprise, if required,
at least two compressor stages and associated piping means, one stage of which generates an interstage compressed refrigerant, an interstage cooler in which the interstage compressed refrigerant is cooled and partially condensed thereby yielding a two-phase interstage refrigerant, a separator and associated piping means in which the two-phase interstage refrigerant is separated into an interstage refrigerant vapor and an interstage refrigerant liquid;

an additional compressor stage in which the interstage refrigerant vapor is compressed to yield a further compressed refrigerant, pump and associated piping means for pressurizing the interstage refrigerant liquid, and piping means for combining the resulting pressurized interstage refrigerant liquid and the further compressed refrigerant to yield the compressed first mixed refrigerant of (a).

The system may further comprise (1) distillation and associated piping means for introducing the cooled pressurized feed gas into a distillation column, wherein the cooled pressurized feed gas is a methane-rich feed gas obtained from natural gas, into an overhead stream further enriched in methane and a bottoms stream comprising components heavier than methane;

(2) separation means and associated piping means for separating the bottoms stream into a light hydrocarbon stream comprising components having up to four carbon atoms and a heavy hydrocarbon stream comprising components having more than four carbon atoms;

(3) cooling means within the first heat exchange means for cooling the light hydrocarbon stream; and (4) piping means for combining the resulting cooled light hydrocarbon stream of (3) with the overhead stream of (1) prior to the further cooling and condensing by indirect heat exchange in the second heat exchange means.

Optionally, the system further comprises piping means for introducing a portion of the pressurized feed gas into the distillation column at a location which is below the location at which the cooled pressurized feed gas is introduced into the distillation column.

The system also may include means for removing hydrocarbons heavier than methane from the cooled pressurized feed gas, wherein the cooled pressurized feed gas is a methane-rich feed gas obtained from natural gas, prior to further cooling and condensing by indirect heat exchange in a second heat exchange zone in (b), which means comprise (1) a distillation column for separating the cooled pressurized feed gas into an overhead stream of further enriched in methane and a bottoms stream of components heavier than methane;

(2) separation means for separating the bottoms stream into a light hydrocarbon stream containing components having three or less carbon atoms and a heavy hydrocarbon stream comprising components having a more than three carbon atoms;

(3) cooling means within the first heat exchange means for cooling the light hydrocarbon stream; and (4) piping means for introducing a portion of the resulting cooled hydrocarbon stream of (3) as reflux for the distillation column of (1).

The first compression means can comprise if required
at least two compressor stages and associated piping means, one stage of which generates an interstage compressed refrigerant, an interstage cooler in which the interstage compressed refrigerant is cooled and partially condensed thereby yielding a two-phase interstage refrigerant, a separator and associated piping means in which the two-phase interstage refrigerant is separated into an interstage refrigerant vapor and an interstage refrigerant liquid, and an additional compressor stage in which the interstage refrigerant vapor is compressed to yield a further compressed refrigerant.

This system would further comprise piping means to provide the further compressed refrigerant as the compressed first mixed refrigerant which is cooled, condensed, and flashed to provide the first vaporizing mixed refrigerant in (a) above, piping means transfer the interstage refrigerant liquid to the first heat exchange means, heat transfer means within the first heat exchange means for cooling the interstage refrigerant liquid, pressure reduction means to flash the resulting cooled interstage refrigerant liquid to provide additional vaporizing mixed refrigerant at the first essentially constant pressure, and piping means to introduce the additional vaporizing mixed refrigerant into the first heat exchange means to provide refrigeration therein.

The system would also include (1) a separator for separating the cooled second compressed mixed refrigerant, when the cooled second compressed mixed refrigerant is partially condensed, to yield an intermediate second mixed refrigerant vapor and an intermediate second mixed refrigerant liquid;

(2) heat transfer means within the second heat exchange means to cool the intermediate second mixed refrigerant liquid;

(3) pressure reduction means to flash the resulting subcooled intermediate second mixed refrigerant liquid to provide additional vaporizing mixed refrigerant at the second essentially constant pressure, and (4) piping means to introduce the additional vaporizing mixed refrigerant into the second heat exchange means to provide refrigeration therein.

DETAILED DESCRIPTION OF THE INVENTION

Figure 1:
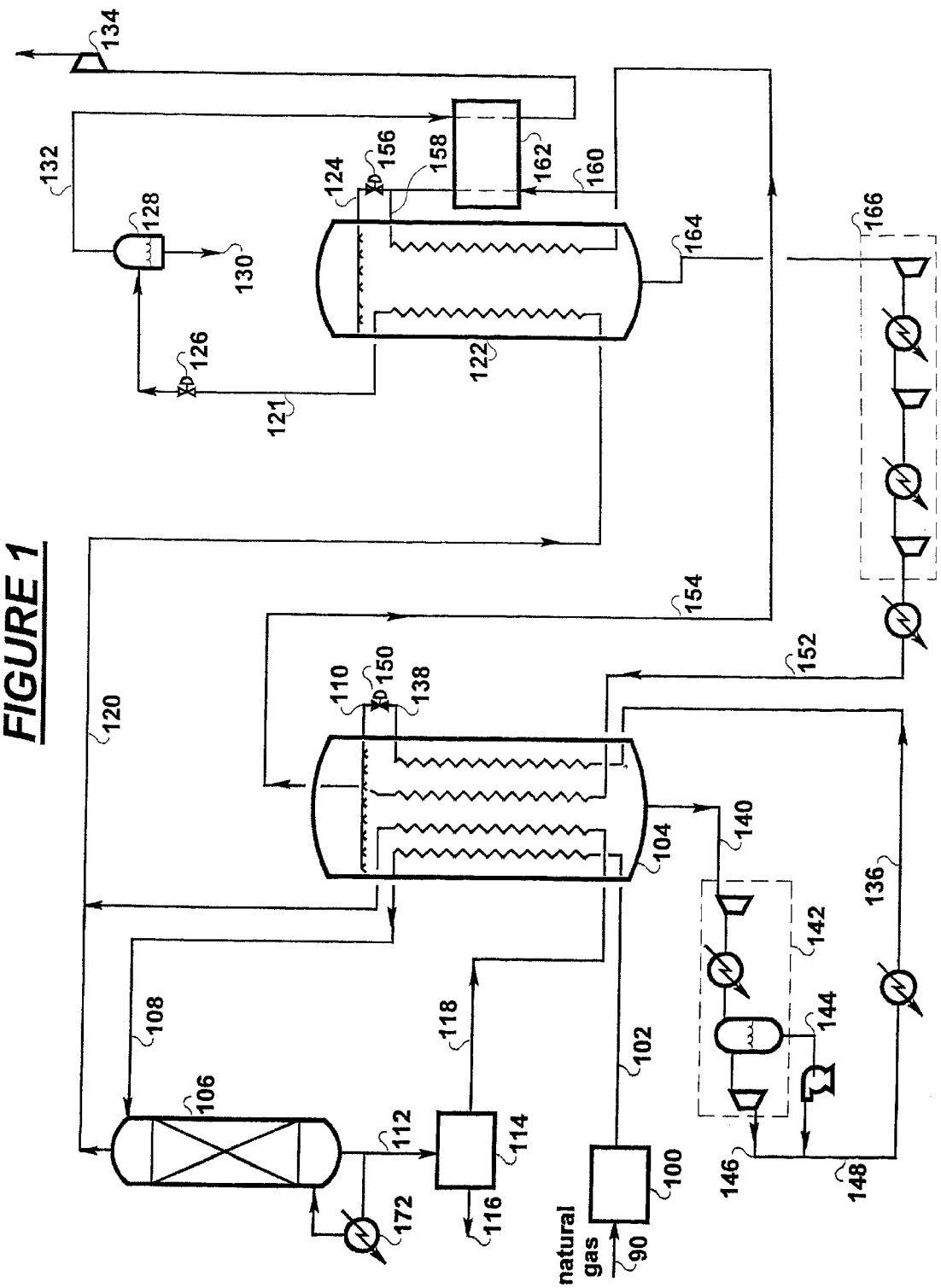
FIG. 1 is a schematic flowsheet of the main embodiment of the present invention.

The present invention is an efficient process and system for gas liquefaction which is particularly useful for the liquefaction of natural gas on a ship, barge, or offshore platform where space is at a premium. The invention minimizes both the size and number of required equipment items.

According to the invention, dual mixed component refrigerants are used to provide the refrigeration to the system, and no propane or other single hydrocarbon precooling systems are required. High level or warmer refrigeration is provided in an optimum temperature range for removal of heavier hydrocarbons from the feed by distillation, and the refrigeration is provided at a single vaporizing pressure for simultaneously precooling the natural gas feed and cooling the low level or cold mixed refrigerant.

The low level mixed refrigerant provides refrigeration at a single vaporizing pressure to achieve final cooling and liquefaction of the feed. The low level mixed refrigerant vapor is compressed cold at approximately the minimum temperature provided by the high level mixed refrigerant. Each mixed refrigerant comprises one or more components chosen from nitrogen, methane, ethane, ethylene, propane, propylene, i-butane, butane, i-pentane, and other hydrocarbons. Other compounds such as chlorinated and/or fluorinated hydrocarbons could be included in the mixed refrigerant.

The method of providing high level refrigeration using a mixed component circuit consists of compressing a high level mixed component stream and cooling it using an external cooling fluid such as air or cooling water. A portion of the mixed refrigerant may be liquefied by external cooling between compression stages. In an efficient embodiment of the invention this liquid is pumped, mixed with the gas exiting the final stage of compression, and cooled using external cooling. A portion of the compressed high level mixed refrigerant stream is liquefied after the external cooling.

At least a portion of the compressed and cooled mixed refrigerant stream is further cooled in a heat exchanger and then reduced in pressure and vaporized by heat exchange while cooling the feed gas and low level mixed refrigerant. The evaporated and warmed mixed refrigerant steam is compressed and recirculated. According to the invention, the high level mixed refrigerant circuit provides refrigeration at temperature levels from −20° C. to −70° C. as a fraction of the total refrigeration needed for natural gas liquefaction.

The method of providing low level refrigeration using a mixed component circuit consists of compressing a mixed component stream and cooling the compressed stream using an external cooling fluid such as air or cooling water. At least a portion of the compressed and cooled mixed refrigerant stream is further cooled in a heat exchanger using high level mixed refrigerant, and after further cooling is reduced in pressure (flashed) and vaporized by heat exchange against the cooling and condensing feed gas stream. The evaporated and warmed mixed refrigerant steam is compressed cold without further heat exchange and recirculated.

The main embodiment of the invention is illustrated in FIG. 1. Feed gas 90, typically a methane-containing gas and preferably natural gas, at a pressure up to about 300 bar absolute (all pressures reported herein are absolute pressures) is dried and cleaned by known methods in pretreatment section 100 for the removal of acid gases such as $CO_2$ and $H_2S$ along with other contaminants such as mercury or mercury-containing compounds.

Pretreated gas 102 enters the first heat exchanger or heat exchange zone 104 and is cooled therein to an intermediate temperature of approximately −20° C. to −70° C. The actual temperature level of this cooling step depends on the feed composition and desired LNG product specification (e.g. heating value), and sometimes is dictated by a desire to achieve a certain power split between compression services. Cooling in heat exchanger 104 is effected by the warming and vaporization of high level mixed refrigerant stream 110, which typically contains one or more hydrocarbons selected from methane, ethane, propane, i-butane, butane, and possibly i-pentane, and may contain other components such as nitrogen.

Cooled feed stream 108 is introduced into reboiled stripper or scrub column 106 for the removal of hydrocarbons heavier than methane. Bottoms product stream 112 enters fractionation section 114 in which pentane and heavier components are separated and recovered in stream 116. A portion of the bottoms stream from scrub column 106 is vaporized in heater 172 to provide boilup or stripping gas to the column. Butane and lighter components are recovered as stream 118, which is cooled in heat exchanger 104 and combined with the overhead product of scrub column 106 to yield precooled feed stream 120. Alternatively, depending on LNG product specifications, fractionation may be carried out such that stream 118 contains propane and lighter components.

Precooled feed stream 120 is further cooled and liquefied in heat exchanger 122 by indirect heat exchange by warming and vaporizing low level mixed refrigerant stream 124. The resulting liquefied product stream 121, typically liquefied natural gas (LNG), is flashed by adiabatic pressure reduction to a low pressure across throttling valve 126. Alternatively, the pressure of liquefied product stream 121 may be reduced by work expansion across a turboexpander.

The reduced pressure LNG product stream is introduced into storage tank 128, from which final liquefied product stream 130 is withdrawn. In some cases, depending on the natural gas feed composition and the temperature of stream 121 from heat exchanger 122, a significant quantity of light gas 132 can be evolved after the flashing across valve 126. Flash gas stream 132 typically is warmed, for example in heat exchanger 162, and compressed in offgas compressor 134 for use as fuel gas.

Refrigeration to cool the natural gas feed from ambient temperature to a temperature of about −20° C. to −70° C. is provided by a high level multi-component refrigeration loop as mentioned above. Stream 136 is the high level mixed refrigerant after compression and cooling, and typically contains some condensed liquid. The stream enters heat exchanger 104 at ambient temperature and an elevated pressure typically above about 3 bar absolute, and is condensed, cooled, and optionally subcooled to a temperature of approximately −20° C. to −70° C. exiting as stream 138. Stream 138 is flashed adiabatically to a low pressure in the range of about one to about 30 bar absolute across throttling valve 150 and reduced pressure stream 110 is introduced to the cold end of heat exchanger 104. Alternatively, the pressure of cooled refrigerant stream 138 can be reduced by work expansion across a turboexpander. The flashing step, which is defined as either isenthalpic or essentially isentropic pressure reduction, can include cooling or vaporization and can be achieved either by throttling across a pressure reducing valve or by work expansion in a turboexpander or expansion engine.

Flashed high level refrigerant stream 110 is warmed and vaporized in heat exchanger 104, and leaves the exchanger as vapor refrigerant stream 140, preferably at a temperature below the temperature of compressed refrigerant stream 136 returning to heat exchanger 104. Vapor refrigerant stream 140 is compressed in multi-staged intercooled compressor 142 to a pressure above about 3 bar absolute. Liquid 144 can be formed in the intercooler(s) of staged compressor 142, and if so is preferably pumped and combined with compressed refrigerant vapor 146 from the final stage of compressor 142. Combined refrigerant stream 148 is cooled to near ambient temperature to provide high level mixed refrigerant stream 136 as earlier described. More than two stages of compression may be used as necessary.

The combined steps of condensing liquid between compression stages, pumping the condensed liquid to the pressure of the following compression stage vapor discharge, combining the vapor and liquid streams, and cooling the combined stream increases the efficiency of the overall gas liquefaction cycle. This is realized by a reduction in the mass flow of gas compressed by the following compression stage and a reduced refrigeration duty in heat exchanger 104.

Final cooling of gas feed stream 120 from approximately −20° C. to −70° C. to the final liquefaction temperature is accomplished using a low level mixed refrigerant loop containing refrigerant components as earlier described. Compressed low level mixed refrigerant stream 152 at about ambient temperature and a pressure greater than about 3 bar absolute enters exchanger 104 and is cooled therein by indirect heat exchange to a temperature of approximately −20° C. to −70° C., exiting as cooled low level mixed refrigerant stream 154.

Refrigerant stream 154 is further cooled and optionally subcooled in heat exchanger 122 to a final temperature below about −125° C., and the cooled stream 158 is flashed isenthalpically across throttling valve 156 to a pressure of about 3.3 bar absolute. Alternatively, the pressure of cooled stream 158 can be reduced by work expansion across a turboexpander or reciprocating expansion engine. A small portion of refrigerant stream 154, as stream 160, can be cooled in heat exchanger 162 by flash gas stream 132.

Flashed low level mixed refrigerant stream 124 is introduced into the cold end of heat exchanger 122, where it vaporizes to provide refrigeration therein. Vaporized low level mixed refrigerant stream 164 leaves heat exchanger 122 at a temperature below the temperature of cooled refrigerant stream 154 returning to heat exchanger 122. Vaporized refrigerant stream 164 then is compressed directly in multi-stage intercooled compressor 166 to greater than about 5 bar absolute to provide low level mixed refrigerant stream 152. Vaporized low level mixed refrigerant stream 164 is not used to precool feed gas or other process streams, and therefore passes directly to compression without preheating.

Heat exchangers 104 and 122 can utilize any suitable heat exchange devices such as wound coil, shell and tube, or plate-fin exchangers known in the art. Wound coil exchangers are preferred for their compact dimensions and efficient heat transfer performance.

Figure 2:
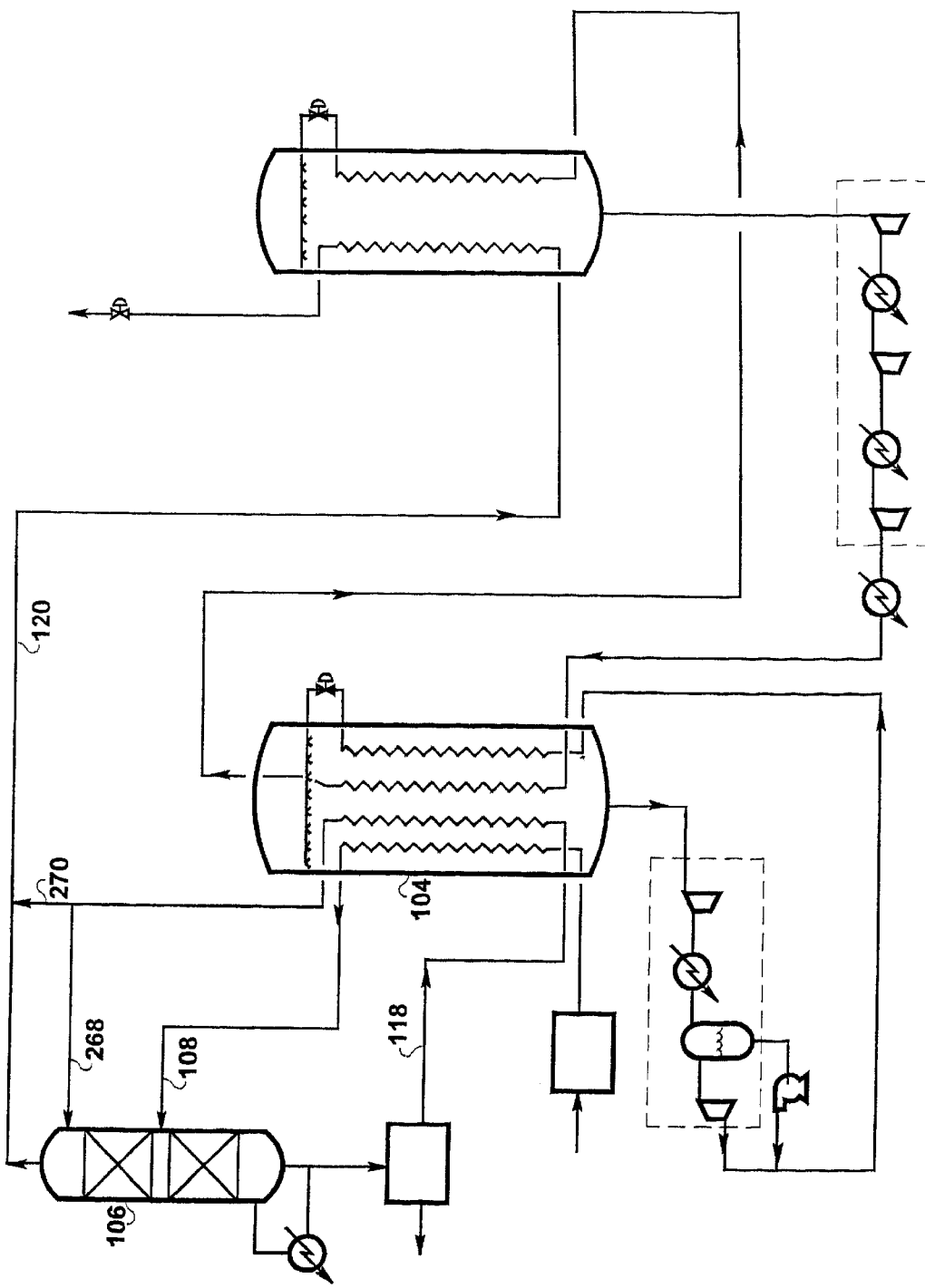
FIG. 2 is a schematic flowsheet of a first alternative embodiment of the present invention.

An alternative embodiment of the present invention is given in FIG. 2. In this embodiment, stream 118 containing butane and lighter components is recycled to exchanger 104, cooled therein, and divided into two portions 268 and 270. Portion 268 is used to as reflux in scrub column 106 for the removal of heavy components such as benzene to very low levels. Remaining portion 270 is combined with the overhead product of scrub column 106 to yield precooled feed stream 120. The relative flows of streams 268 and 270 will depend upon the feed composition and the required degree of contaminant removal from the feed stream. Alternatively, the system can be operated such that stream 118 contains predominantly propane and lighter components.

Figure 3:
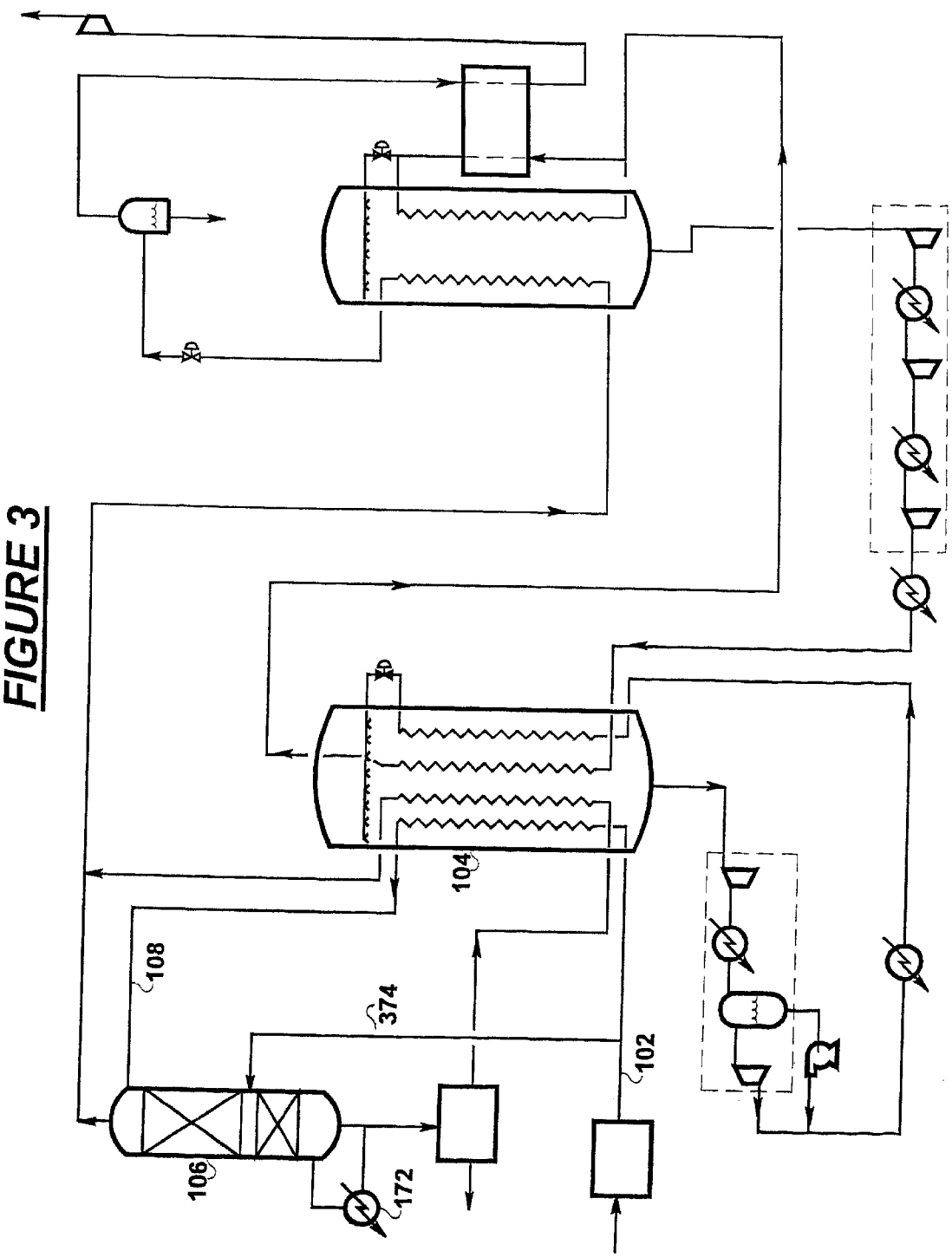
FIG. 3 is a schematic flowsheet of a second alternative embodiment of the present invention.

A second alternative embodiment of the present invention is given in FIG. 3 wherein a small portion 374 of warm natural gas feed 102 is fed directly to scrub column 106 below the top location of feed stream 108 rather than being cooled in exchanger 104. This alternative reduces the amount of external heat required in reboiler exchanger 172 of scrub column 106 to generate stripping vapor. This alternative also decreases the refrigeration load in exchanger 104, and is beneficial when feed 102 contains high levels of heavier hydrocarbons and when the liquid fraction of stream 108 is high.

Figure 4:
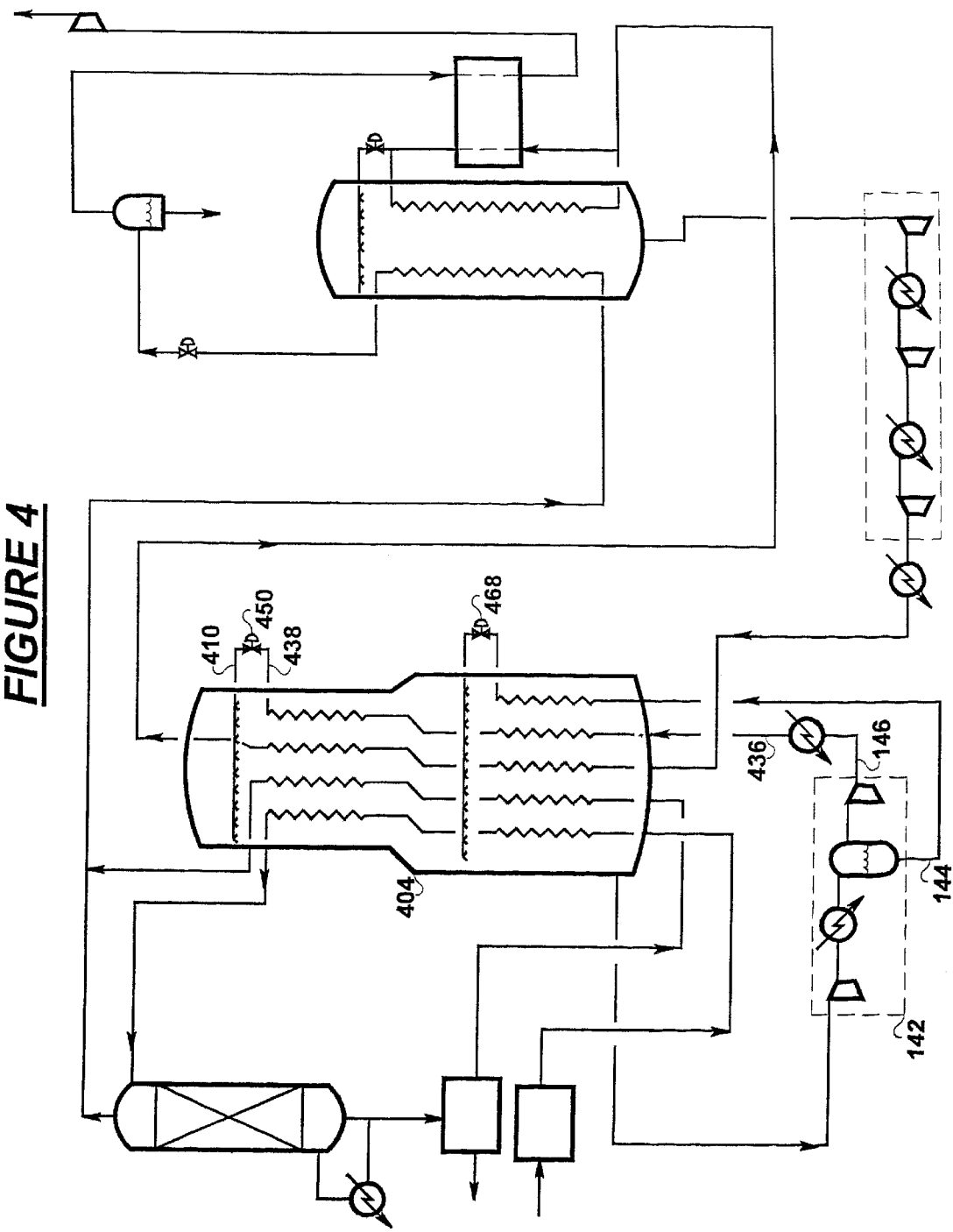
FIG. 4 is a schematic flowsheet of a third alternative embodiment of the present invention.

A third alternative embodiment of the present invention is given in FIG. 4. In this embodiment, high level liquid refrigerant 144 condensing interstage in compressor 142 is fed directly to exchanger 404 rather than being pumped and combined with the compressor discharge as in FIG. 1. The compressed vapor refrigerant 146 is cooled and fed as stream 436 to exchanger 404, in which it is cooled and optionally subcooled to a temperature of approximately −30° C. to −70° C., flashed across throttling valve 450, and fed to exchanger 404 as stream 410. Interstage refrigerant liquid stream 144 is fed to exchanger 404, cooled and optionally subcooled therein to a temperature warmer than stream 438, flashed across throttling valve 468, and introduced to exchanger 404 at an intermediate position in exchanger 404. Pressure drops across each of the throttling valves 450 and 468 are chosen such that the flashed fluids vaporize at essentially the same pressure.

The term "essentially the same pressure" as used here means that the pressure of the vaporizing refrigerant varies within an exchanger only by the small hydraulic or pneumatic pressure drops or variations caused by flowing liquid or vapor. The refrigerant is not vaporized in separate heat exchange conduits or zones at different pressures as described in many of the prior art processes earlier described.

The embodiment of FIG. 4 can be operated at approximately 3%–4% higher efficiency than the embodiment of FIG. 1 but at higher capital cost. Also, heat exchanger 404 will be taller for a given surface area, potentially decreasing the attractiveness for shipboard or barge mounted applications.

Figure 5:
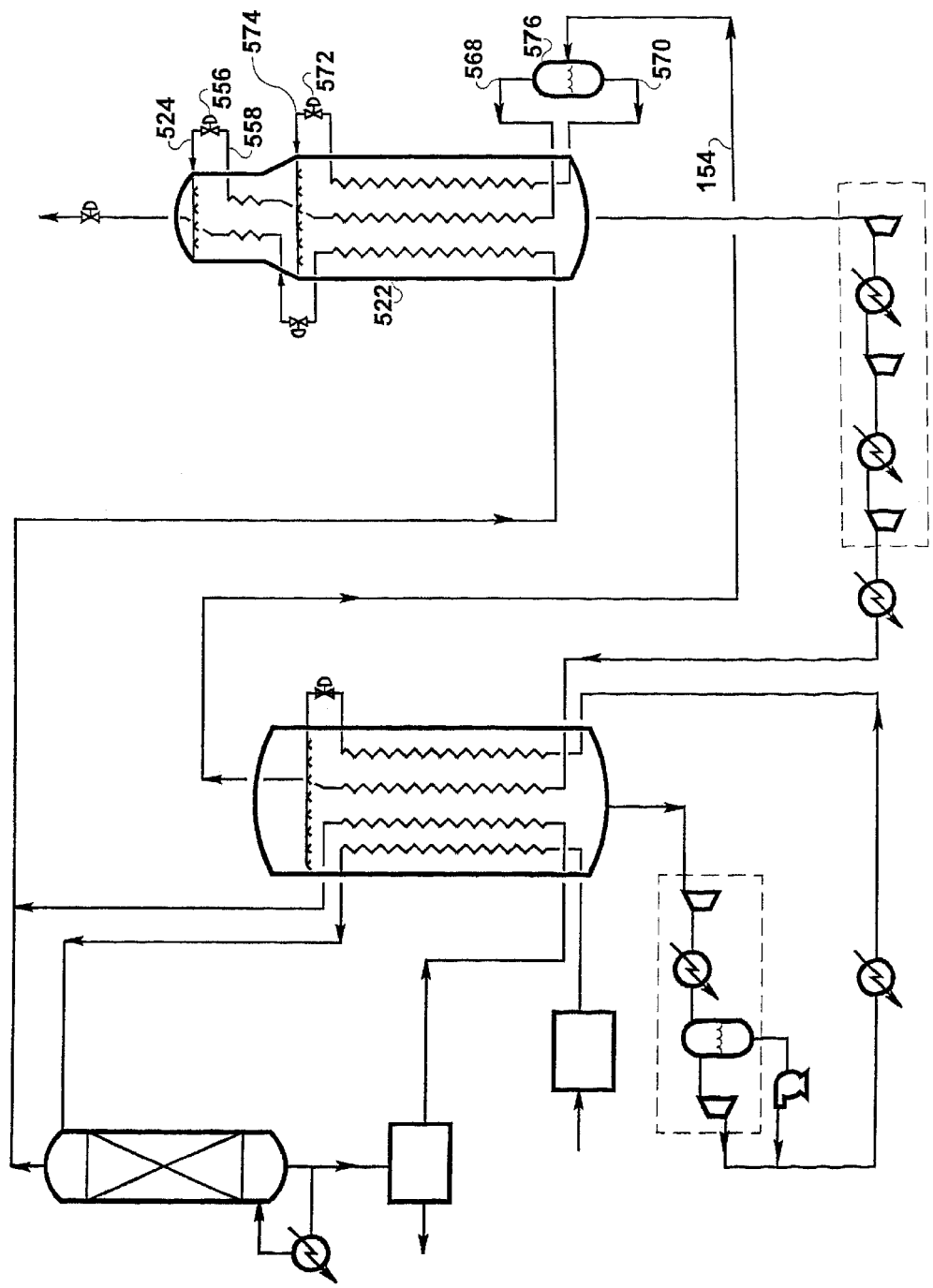
FIG. 5 is a schematic flowsheet of a fourth alternative embodiment of the present invention.

A fourth alternative embodiment of the invention is illustrated in FIG. 5 wherein cooled low level mixed refrigerant stream 154 is a two-phase stream which is separated into vapor stream 568 and liquid stream 570 in drum 576. These refrigerant streams are introduced separately into heat exchanger 522. Vapor refrigerant stream 568 is liquefied and optionally subcooled to a low temperature and is flashed isenthalpically across throttling valve 556 to yield refrigerant stream 524, which is introduced into the cold end of heat exchanger 522 where it is vaporized to provide a portion of the refrigeration for product liquefaction. Liquid refrigerant stream 570 is subcooled in heat exchanger 522 to a temperature warmer than stream 558 and is flashed adiabatically across throttling valve 572 to low pressure refrigerant stream 574, which is introduced at an intermediate point into heat exchanger 522, where it is vaporized to provide the remaining portion of the refrigeration for product liquefaction. The vaporization pressure of the two refrigerant streams in the heat exchanger is typically in the range of about one to about 30 bar absolute.

The embodiment of FIG. 5 exhibits approximately 4% higher efficiency than the embodiment of FIG. 1, but will have a higher capital cost. Also, heat exchanger 522 will be taller for a given plot area, potentially decreasing the attractiveness for shipboard or barge mounted applications.

EXAMPLE

A natural gas liquefaction process according to FIG. 1 was simulated in heat and material balance calculations to illustrate the present invention. Natural gas feed 90 is first cleaned and dried in pretreatment section 100 for the removal of acid gases such as $CO_2$ and $H_2S$ along with other contaminants such as mercury. Pretreated feed gas 102 at a flow rate of 17,470 kg-mole/hr, a pressure of 52 bar absolute, and a temperature of 38° C. has a molar composition as given in Table 1 below.

TABLE 1

Feed Gas Composition for Example

| Component | Mole Fraction |
|---|---|
| Nitrogen | 0.005 |
| Methane | 0.8738 |
| Ethane | 0.067 |
| Propane | 0.035 |
| i-Butane | 0.006 |
| Butane | 0.009 |
| i-Pentane | 0.003 |
| Pentane | 0.002 |
| Hexane | 0.001 |

Pretreated feed gas 102 is precooled in heat exchanger 104 to a temperature of −36° C. and precooled feed stream 108 enters scrub column 106. The cooling in heat exchanger 104 is effected by the warming and vaporization of high level mixed refrigerant stream 110 at a flow of 25,433 kg-mole/hr. The composition of refrigerant stream 110 is as follows (in mole fractions): methane, 0.01; ethane, 0.47; propane, 0.06; i-butane, 0.16; and butane, 0.30.

Pentane and heavier components of the feed are removed in scrub column 106. Bottoms product 112 of scrub column 106 enter fractionation section 114 in which components heavier than propane are recovered as stream 116. Propane and lighter components are recovered as stream 118 which is cooled to −36° C. in heat exchanger 104 and recombined with the overhead product of the scrub column to form precooled feed stream 120 at a flow rate of 17,315 kg-mole/hr.

Precooled feed stream 120 is further cooled and liquefied in heat exchanger 122 to a temperature of −162° C. by indirect heat exchange with warming and vaporizing low level mixed refrigerant stream 124, which enters heat exchanger 122 at a molar flow rate of 28,553 kg-mole/hr, a temperature of −164° C., a pressure of 3.35 bar absolute. The composition of refrigerant stream 120 is as follows (in mole fractions): nitrogen, 0.14; methane, 0.35; ethane, 0.41; and propane, 0.10.

The resulting liquefied natural gas (LNG) stream (121) is then flashed adiabatically across throttling valve 126 to its bubble point pressure of 1.05 bar absolute. The flashed LNG stream enters tank 128 from which final LNG product stream 130 is withdrawn. In this Example, no light gas 132 is evolved after flashing across valve 126, so that heat exchanger 162 and compressor 134 are not required.

Refrigeration to cool the natural gas feed 102 from ambient temperature to a temperature of −36° C. is provided by a high level multi-component refrigeration loop as described earlier. High level mixed refrigerant stream 136 enters heat exchanger 104 at a temperature of 38° C. and a pressure of 24 bar absolute. It is cooled to a temperature of −36° C. in heat exchanger 104 then flashed across throttling valve 150 to yield reduced pressure refrigerant stream 110 at a temperature of −38° C. Stream 110 is warmed and vaporized in heat exchanger 104, and exits therefrom at 34° C. and 3.8 bar absolute as refrigerant vapor stream 140. This low pressure refrigerant vapor is compressed in 2-stage intercooled compressor 142 to a final pressure of 24 bar absolute. Liquid 144 formed in the intercooler of the compressor is pumped and recombined with the compressed refrigerant 146 from the final compressor stage. The liquid flow of combined refrigerant stream 148 is 12,870 kg-mole/hr.

Final cooling of the natural gas feed from −36° C. to about −162° C. in heat exchanger 122 is provided by a low level multi-component refrigeration loop as mentioned above. Compressed low level mixed refrigerant stream 152 enters heat exchanger 104 at a temperature of 38° C. and a pressure of 55 bar absolute, where it is cooled to a temperature of −36° C. as stream 154. This precooled low level refrigerant is further cooled to a temperature of −162° C. in heat exchanger 122 to yield stream 158, which is flashed across throttling valve 156. Reduced pressure refrigerant stream 124 is then warmed and vaporized in exchanger 122, finally exiting the exchanger 122 at −39° C. and 3.25 bar absolute as stream 164. This low pressure vapor refrigerant stream is then compressed in 3-stage intercooled compressor 166 to the final pressure of 55 bar absolute.

Thus the present invention provides for the liquefaction of feed gas using a minimum number of heat exchangers and utilizes mixed refrigerants, wherein each refrigerant is vaporized at an essentially constant pressure in each of the exchangers. These characteristics reduce the process complexity and required plant plot plan area compared with known liquefaction processes. Each of the earlier described prior art processes utilizes at least two refrigerant vaporization pressure levels in at least one of the heat exchangers in low level and high level cooling service. The process and system of the invention are especially well-suited for installation on ships, barges, and offshore platforms by virtue of simplified process features and minimum plot plan area requirements. The present invention includes the feature wherein feed precooling, low level refrigerant precooling, and high level refrigerant cooling are effected in a single heat exchanger against high level refrigerant vaporizing at a single essentially constant pressure. In addition, the process does not require a separate feed precooling heat exchanger, since feed precooling is achieved in combination with low level refrigerant precooling and high level liquid refrigerant cooling. Low level mixed refrigerant is not used to precool the feed gas and therefore passes directly to compression without preheating. This results in a compressor which requires fewer intercoolers for a given overall pressure ratio, since the pressure ratio in the first stage can be quite high.

The essential characteristics of the present invention are described completely in the foregoing disclosure. One skilled in the art can understand the invention and make various modifications without departing from the basic spirit of the invention, and without deviating from the scope and equivalents of the claims which follow.

What is claimed is:

1. A method for liquefying a pressurized feed gas which comprises:
    (a) cooling the pressurized feed gas by indirect heat exchange in a first heat exchange zone with a first vaporizing mixed refrigerant which is vaporized at a first essentially constant pressure to yield a cooled feed gas and a first mixed refrigerant vapor;
    (b) further cooling and condensing the cooled feed gas by indirect heat exchange in a second heat exchange zone with a second vaporizing mixed refrigerant which is vaporized at a second essentially constant pressure to yield a liquid product and a second mixed refrigerant vapor;
    (c) compressing the first mixed refrigerant vapor; and cooling, condensing and flashing the resulting compressed first mixed refrigerant vapor to provide the first vaporizing mixed refrigerant; and
    (d) compressing the second mixed refrigerant vapor; and cooling condensing and flashing the resulting compressed second mixed refrigerant vapor to provide the second vaporizing mixed refrigerant, wherein at least a portion of the refrigeration for the cooling and condensing of the second mixed refrigerant vapor is provided by indirect heat exchange in the first heat exchange zone with the first vaporizing liquid mixed refrigerant;
    wherein the compressing of the first mixed refrigerant vapor in (c) is carried out in at least two stages of compression which generates an interstage compressed refrigerant; the interstage compressed refrigerant is cooled, partially condensed, and separated into an interstage refrigerant vapor and an interstage refrigerant liquid; the interstage refrigerant vapor is compressed to yield a further compressed refrigerant which is cooled, condensed, optionally subcooled, and flashed to provide the first vaporizing mixed refrigerant in (a); and the interstage liquid refrigerant is subcooled and flashed at the first essentially constant pressure to yield additional refrigeration in the first heat exchange zone.

2. A system for liquefying a pressurized feed gas which comprises:
    (a) a first heat exchange means for cooling the pressurized gas feed, for cooling a compressed first mixed refrigerant, and for cooling a compressed second mixed refrigerant, wherein cooling is effected at least in part by indirect heat exchange with a first vaporizing mixed refrigerant which is vaporized at a first essentially constant pressure, wherein the cooling yields a cooled pressurized feed gas, a liquefied first mixed refrigerant, and a cooled second compressed mixed refrigerant, and wherein the first vaporizing mixed refrigerant yields a first mixed refrigerant vapor;
    (b) first compression means for compressing the first mixed refrigerant vapor to provide the compressed first mixed refrigerant;
    (c) pressure reduction means for flashing the liquefied first mixed refrigerant to provide the first vaporizing mixed refrigerant;
    (d) second heat exchange means for further cooling and condensing the cooled feed gas and for further cooling and liquefying the cooled second compressed mixed refrigerant, wherein cooling is effected at least in part by indirect heat exchange with a second vaporizing mixed refrigerant which is vaporized at a second essentially constant pressure, wherein the cooling yields a liquid product and liquefied second mixed refrigerant, and wherein the second vaporizing mixed refrigerant yields a second mixed refrigerant vapor;
    (e) second compression means for compressing the second mixed refrigerant vapor to provide the compressed second mixed refrigerant;
    (f) pressure reduction means for flashing the liquefied second mixed refrigerant to provide the second vaporizing mixed refrigerant; and
    (g) piping means for
        introducing the pressurized feed gas into the first heat exchange means,
        transferring the cooled feed gas from the first heat exchange means to the second heat exchange means,
        withdrawing a liquid product from the second heat exchange means,
        transferring the first mixed refrigerant vapor from the first heat exchange means to the first compression means and for transferring the resulting compressed first mixed refrigerant vapor from the first compression means to the first heat exchange means,
        transferring the cooled second compressed mixed refrigerant from the first heat exchange means to the second heat exchange means, and
        transferring the second mixed refrigerant vapor from the second heat exchange means to the second compression means and for transferring the resulting compressed second mixed refrigerant vapor from the second compression means to the first heat exchange means
    wherein the first compression means comprises
        at least two compressor stages and associated piping means, one stage of which generates an interstage compressed refrigerant,
    an interstage cooler in which the interstage compressed refrigerant is cooled and partially condensed thereby yielding a two-phase interstage refrigerant,
    a separator and associated piping means in which the two-phase interstage refrigerant is separated into an interstage refrigerant vapor and an interstage refrigerant liquid, and
    an additional compressor stage in which the interstage refrigerant vapor is compressed to yield a further compressed refrigerant,
    and wherein the system further comprises
        piping means to provide the further compressed refrigerant as the compressed first mixed refrigerant which is cooled, condensed, and flashed to provide the first vaporizing mixed refrigerant in (a),
    piping means transfer the interstage refrigerant liquid to the first heat exchange means,
    heat transfer means within the first heat exchange means for cooling the interstage refrigerant liquid,
    pressure reduction means to flash the resulting cooled interstage refrigerant liquid to provide additional vaporizing mixed refrigerant at the first essentially constant pressure, and
    piping means to introduce the additional vaporizing mixed refrigerant into the first heat exchange means to provide refrigeration therein.

* * * * *